Figure 1:
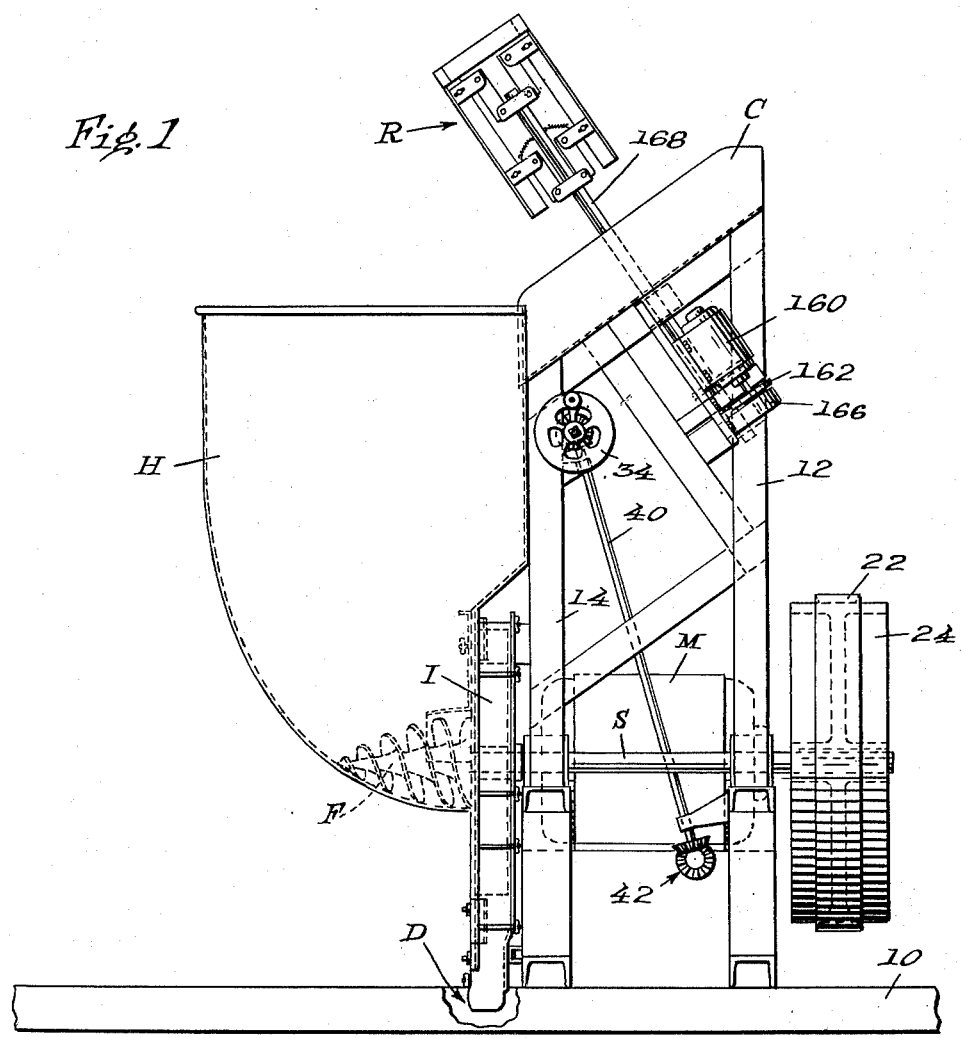

Dec. 12, 1950     H. HARRIS ET AL     2,533,796
APPARATUS FOR PROCESSING PLASTIC MATERIAL
Filed June 11, 1946     7 Sheets-Sheet 1

Inventors
Hubert Harris
and
Lamar M. Ware,
By Cushman, Darby & Cushman
their Attorneys Dec. 12, 1950       H. HARRIS ET AL       2,533,796
APPARATUS FOR PROCESSING PLASTIC MATERIAL
Filed June 11, 1946       7 Sheets-Sheet 2

Inventors
Hubert Harris
and
Lamar M. Ware,
By Cushman, Darby & Cushman
their Attorneys Dec. 12, 1950  H. HARRIS ET AL  2,533,796
APPARATUS FOR PROCESSING PLASTIC MATERIAL
Filed June 11, 1946  7 Sheets-Sheet 3

Inventors
Hubert Harris
and
Lamar M. Ware,
By Cushman, Darby & Cushman
their Attorneys Dec. 12, 1950     H. HARRIS ET AL     2,533,796
APPARATUS FOR PROCESSING PLASTIC MATERIAL Filed June 11, 1946     7 Sheets-Sheet 5

Inventor
Hubert Harris
and
Lamar M. Ware,
By Cushman, Darby & Cushman
their Attorneys

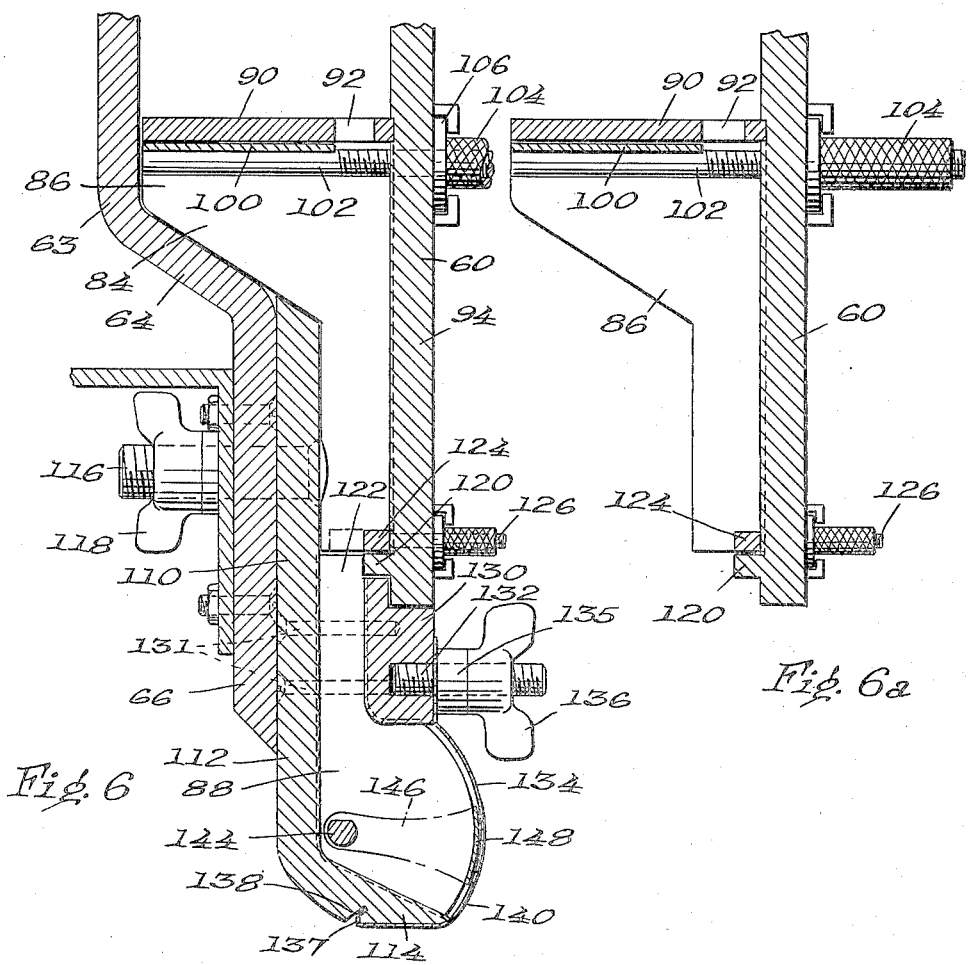
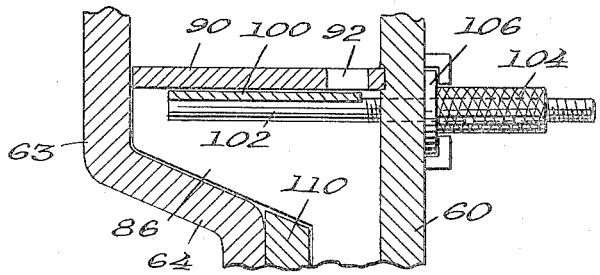

Dec. 12, 1950     H. HARRIS ET AL     2,533,796
APPARATUS FOR PROCESSING PLASTIC MATERIAL
Filed June 11, 1946     7 Sheets-Sheet 7

Inventor
Hubert Harris
and
Lamar M. Ware,
By Cushman, Darby & Cushman
their Attorneys.

Patented Dec. 12, 1950

2,533,796

UNITED STATES PATENT OFFICE 2,533,796

APPARATUS FOR PROCESSING PLASTIC MATERIAL

Hubert Harris and Lamar Mims Ware, Auburn, Ala., assignors to Auburn Research Foundation, Auburn, Ala., a corporation of Alabama Application June 11, 1946, Serial No. 676,040

11 Claims. (Cl. 107—14)

The present invention relates to an apparatus for extruding plastic material, and particularly for extruding food materials of relatively fine texture such as sweet potatoes. The invention is particularly concerned with such materials having substantially no undesirable foreign matter therein such as fibers or pulp, or materials from which such matter has been removed.

The apparatus of the present invention departs radically from prior art devices of similar purpose, in that the plastic material is fed inwardly to the center of rotation of a rapidly turning impeller, the material being discharged from the periphery of the blades of the impeller by centrifugal force. The material thus discharged is simultaneously forced into a plurality of passages extending from the periphery of the impeller, said passages having distribution control means therein to regulate the flow and quantity of the material passing therethrough. Each of the aforesaid passages in turn connects with a number of smaller discharge conduits which are likewise provided with similar distribution control means. Each of said conduits terminates in an individual extrusion die through which the material is continuously or intermittently discharged at the desired rate of flow and in the desired form and condition.

A principal object of the invention is to provide apparatus of the above character wherein the discharge of the material through the extrusion dies may be controlled with great refinement. Specifically, the invention involves control of the distribution of the material through the primary passages mentioned above, as well as through the smaller conduits, a number of the latter leading from a single passage. In association with the previously referred to control devices, the invention includes means for regulating the speed of the impeller, as well as a novel form of conveyor which feeds the material to the impeller.

An important object of the invention is to provide such apparatus having a novel form of screw conveyor which receives the plastic material axially from its end and inwardly from the periphery of its rotating blades, and discharges the material into the center of the impeller.

Another object of the invention is to provide an impeller and an impeller chamber which are relatively narrow in the direction of the axis of the impeller as compared with the diameter of the chamber, whereby the material acted upon by the impeller is substantially confined against axial movement with respect to the impeller and is discharged from its periphery with substantial centrifugal force. In fact, the axial dimension of the chamber is substantially less than the radius of said chamber or the lengths of the impeller blades.

Another object of the invention is to provide extruding apparatus of the type referred to wherein the material discharged from the impeller is sub-divided into separate controlled channels of flow further leading to separate controlled extruding dies.

Another object of the invention is to provide extruding apparatus including die heads which may be conveniently removed for the attachment of substitute die heads with extruding openings of different form, size or character.

It is also an object of the invention to provide apparatus of the character referred to having a novel form of container scraping means associated therewith, and particularly such means which is adjustable for use with containers of various sizes and shapes.

Various other objects and advantages of the invention will become apparent as the description progresses, including the facility with which the machine may be disassembled and assembled for substitution or replacement of parts, or for removal of certain of the elements of the machine in order to clean the same. Throughout the specification, the important feature of the apparatus wherein a controlled product is obtained will be apparent.

Figure 2:
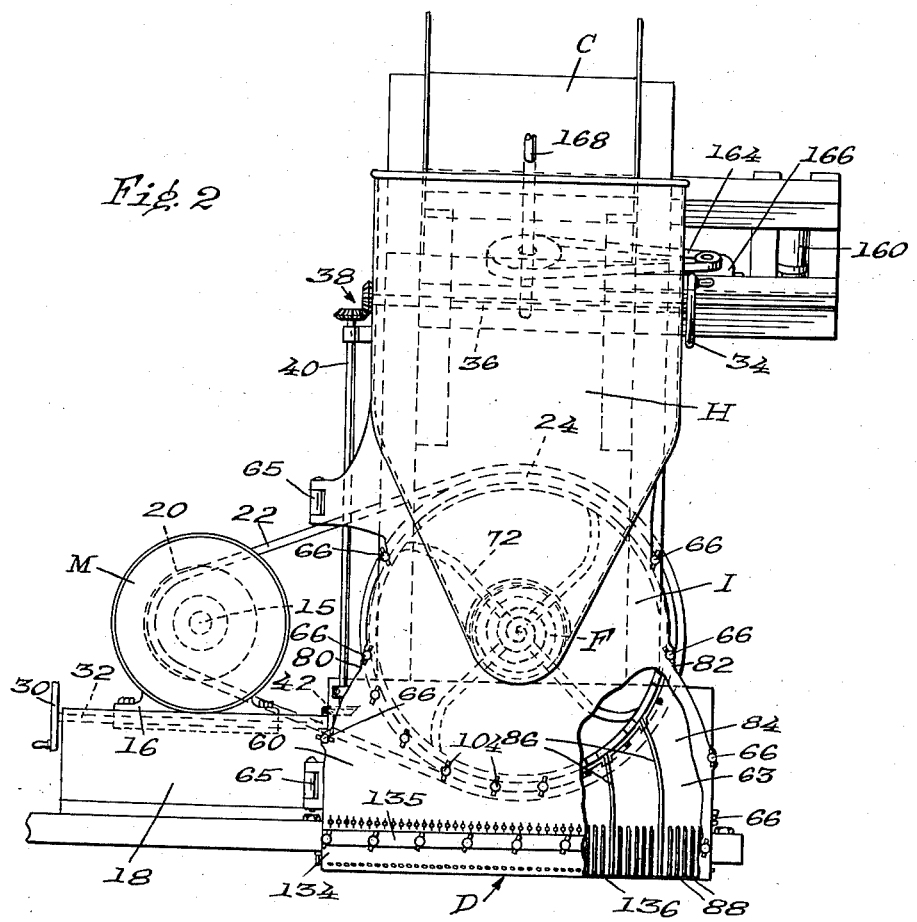
Figures 13, 15, 17:
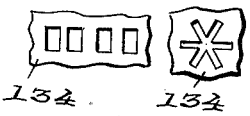
Figure 14:
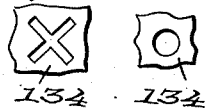
Figure 16:
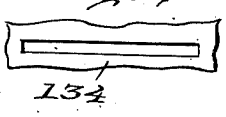
Figure 3:
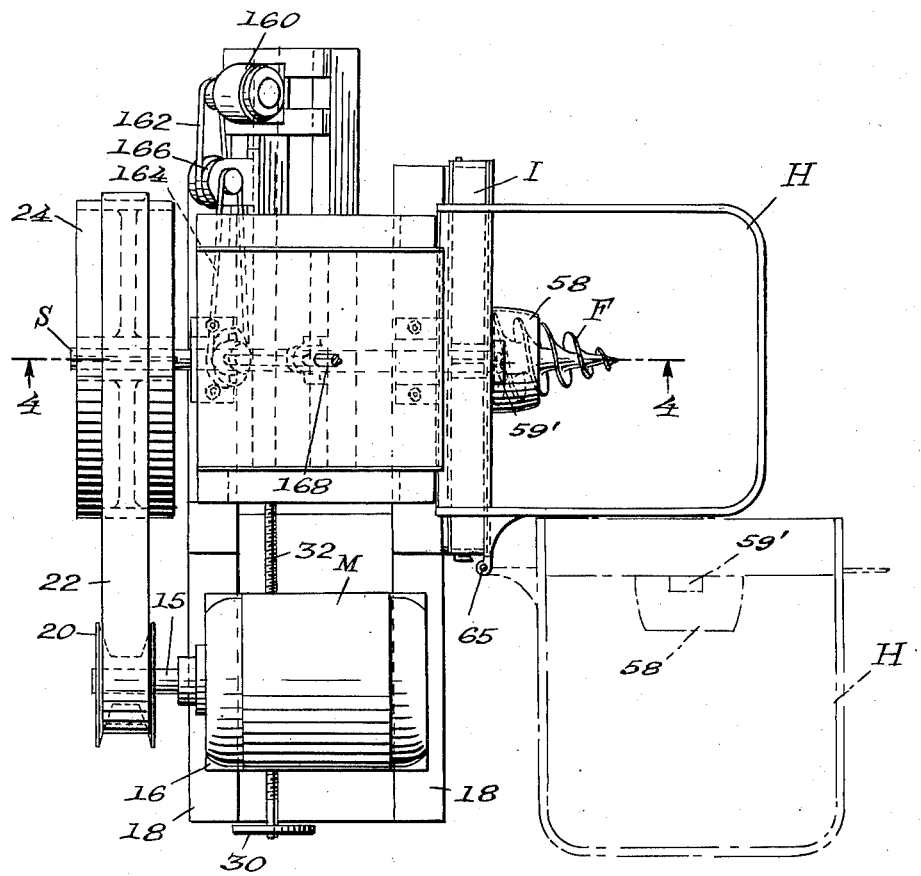
Figure 4:
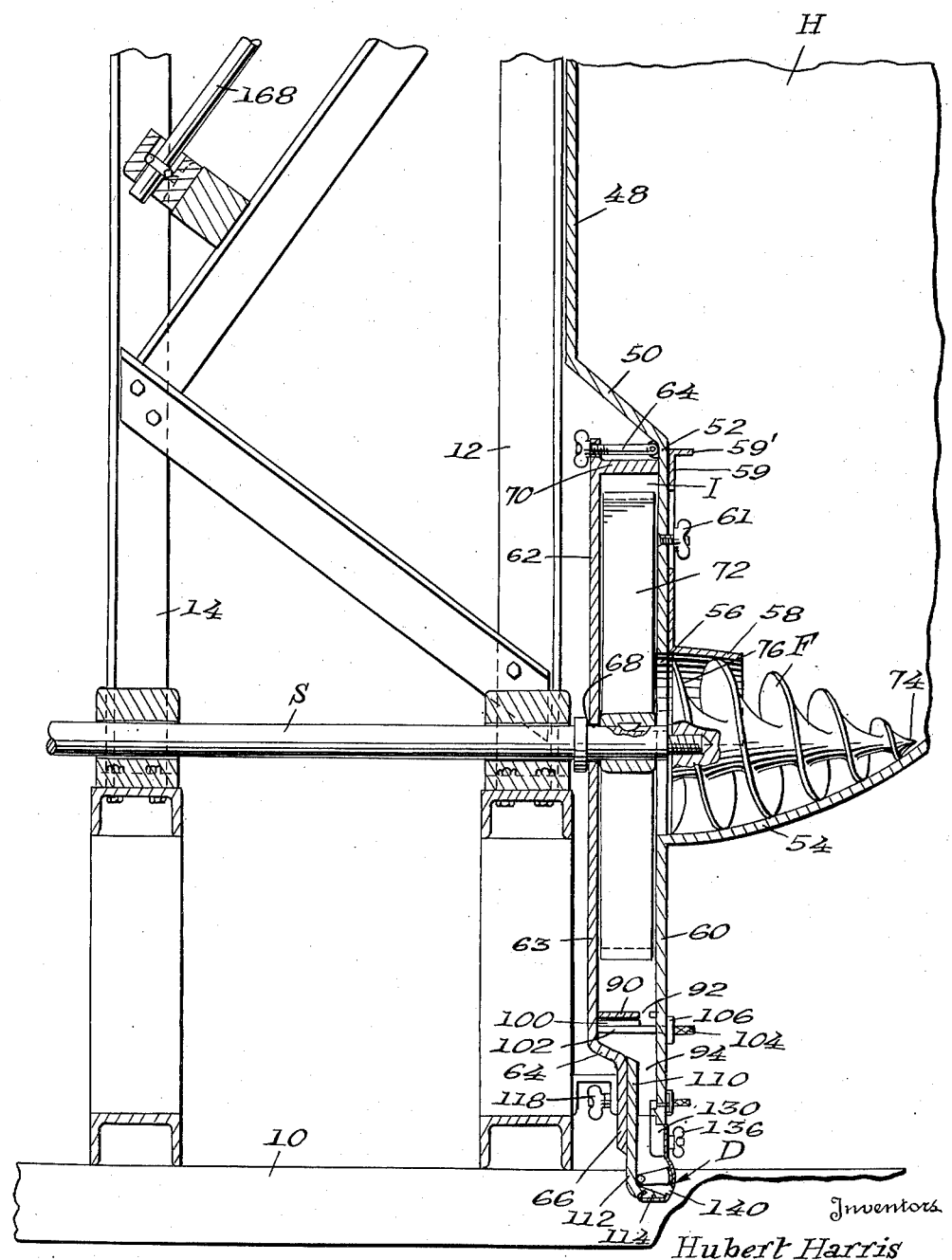
Figure 5:
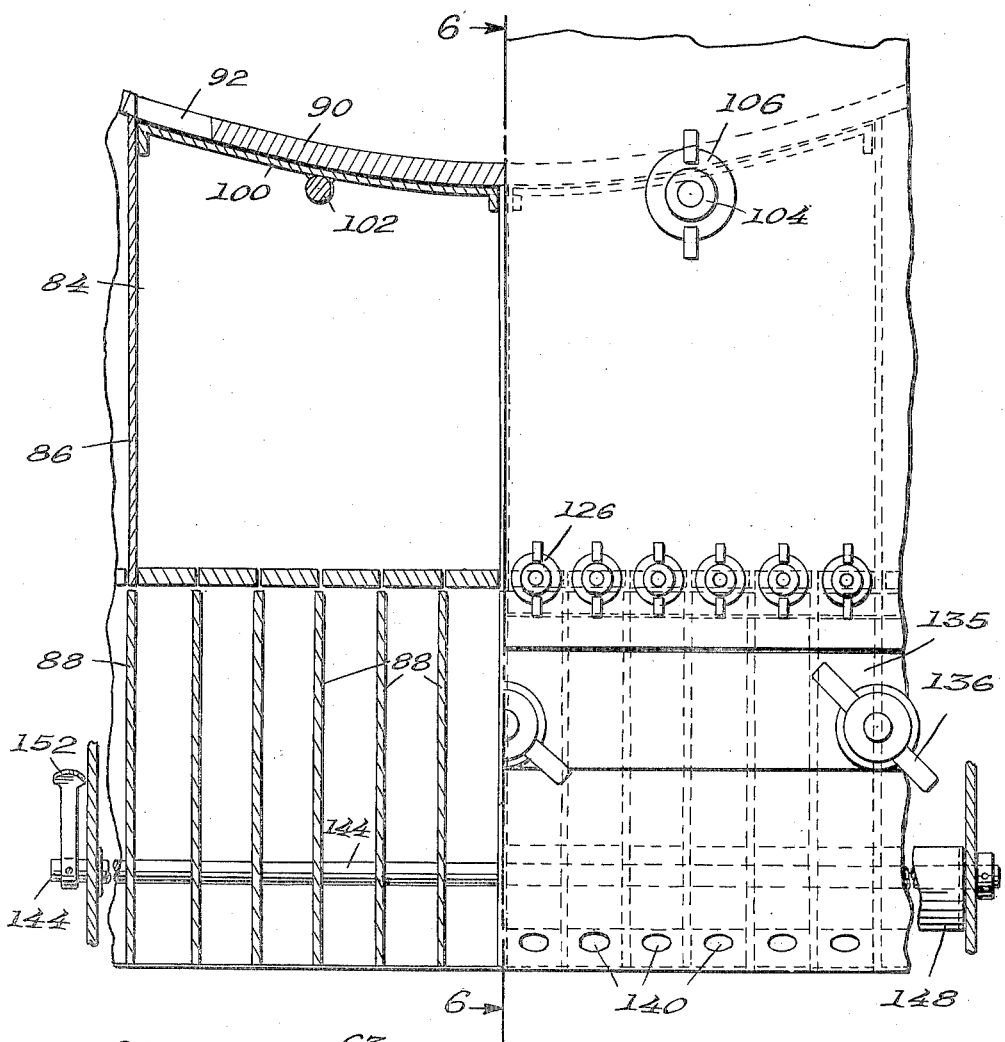
Figure 8:
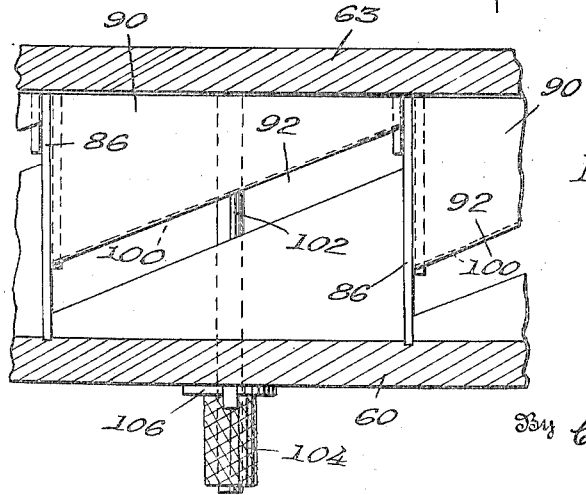
Figures 9, 10, 11:
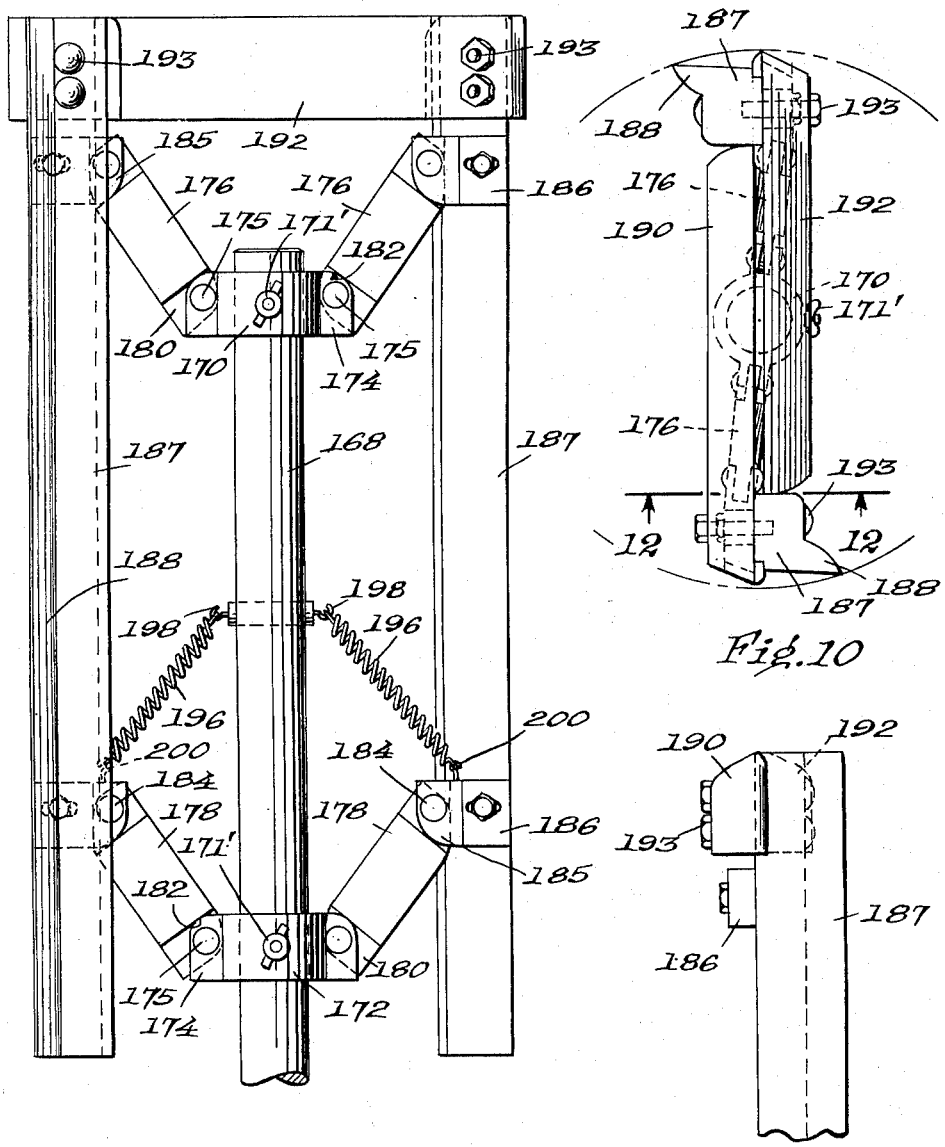
Figure 12:
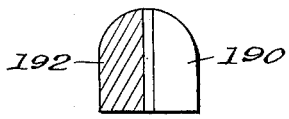

In the drawings, which are not intended to restrict the invention except as defined in the appended claims Figure 1 is a side elevational view of the apparatus, Figure 2 is an end view of the apparatus viewed from the left of Figure 1, Figure 3 is a top plan view of the apparatus, Figure 4 is an enlarged vertical sectional view taken along the line 4—4 of Figure 3, showing particularly the impeller chamber and the impeller, Figure 5 is a partial front elevational view of the extrusion assembly which depends from the impeller chamber, the front wall of the assembly being partially broken away to show the interior thereof, Figure 6 is a transverse vertical sectional view through the removable depending extrusion assembly, taken, for instance, along the line 6—6 of Figure 5, Figure 6a is a view similar to Figure 6 showing how the distributing plates and partitions are carried by front face of the machine, Figure 7 is a partial vertical sectional view similar to Figure 6, showing particularly the distribution control means in an almost closed position, Figure 8 is a partial horizontal sectional view looking downwardly on the distribution control means of the passage illustrated in Figures 6 and 7, also showing the control means in an adjacent passage, Figure 9 is a side elevational view of the container scraping device, Figure 10 is a top view of the container scraping device, Figure 11 is a partial end view of the side scraper arms of Figure 10, Figure 12 is a vertical sectional view through the top scraper blades taken on the line 12—12 of Figure 10, and Figures 13 through 17 show various shapes of extruding orifices which may be provided.

Referring to Figure 1, the material is fed into a downwardly and inwardly converging hopper H with the assistance of a chute C, if necessary, and if the material is delivered in cans or containers, a scraping device R is employed operable above the chute and hopper.

The material is discharged from the lower end of the hopper H by a feed screw F into the impeller chamber I, where a high speed impeller throws the material into a plurality of passages and conduits later to be described, which lead to a multiple die head D. The material is discharged in a controlled manner through a plurailty of orifices of selected size and character which are a part of the die head, into trays or other suitable receptacles which may be continuously moved beneath the die head D. The invention comprehends refined control of the material throughout the process described from the time the material is initially acted on by the feed screw F until it is discharged from the orifices of the extruding die assembly D. These controls include: (1) control of the speed of the feed screw F and of the impeller in the chamber I, and control of the delivery from the former to the latter, (2) two stages of divided and subdivided control between the impeller and the die head D, comprising individual initial distribution control for the flow of separated but relatively large moving masses of the material, and final control of smaller moving masses of the material in conduits leading from said passages, this latter control likewise being independent in each conduit, and (3) final control at each extruding orifice as to size and shape of the mass of material being extruded, as well as of the lengths of perfectly formed material which is discharged from the orifices.

The impeller (to be later described) is driven by a primary source of power such as the electric motor M which indirectly drives a shaft S on which the feed screw F and the impeller are mounted, the drive being through any convenient belt or mechanical gearing with convenient arrangements for changing speed of rotation of the shaft S within any limits desired.

The apparatus may be mounted on base or frame members 10, corner legs 12 and 14 may be provided at opposite ends of the machine constituting supports on which most of the principal elements of the machine are mounted, as will be apparent from the drawings without detailed description.

Referring to Figure 2, the motor M and its shaft 15 may be mounted for adjustment from and toward the impeller shaft on any suitable variable speed base member 16 (such as the standard "Reeves" variable speed base), which may be mounted for slidable movement in suitable guides carried by horizontal members 18. The motor shaft drives a variable speed pulley 20 of any well known type (such as the standard "Reeves" variable speed pulley), which is connected by means of a belt 22 with a driven pulley 24 (Fig. 1). The pulley 24, is keyed to the shaft S, the latter being supported in suitable bearings carried by the frame members previously mentioned. The pulley 20 may be of a well-known type having conically shaped plates which are held in position by the tension of a spring, the belt operating on different diameters between the two plates in accordance with the adjustment of the base 16. The speed of the driven pulley 24 and hence the speed of the impeller and feed screw shaft S may thus be varied to control the condition and rate of delivery of the plastic product as will be hereinafter apparent. The speed adjustment is thus accomplished by inward and outward movements of the supporting base 16, and this adjustment may be made by the turning of a lower hand wheel 30 which in turn rotates a shaft 32 having a threaded connection with the base 16, it being understood that the shaft 32 is held in any suitable manner against longitudinal movement so that its turning will translate the base 16. This adjustment may also be accomplished by a similar hand wheel 34 positioned at a convenient point in the upper part of the machine which turns a shaft 36 extending across the frame of the machine, there being intermeshing beveled gears 38 as shown in Figure 2 which turn a substantially vertical shaft 40 suitably journaled on the frame, the latter likewise serving to turn the shaft 32 through lower connecting similar beveled gears 42 as best shown in Figure 1.

It will be understood that the mechanism for controlling or changing the speed of the shaft S as just described may take other forms, such as conventional change speed gears, the means indicated in the drawings being illustrative only.

Referring to Figure 4, the inner wall of the hopper comprises an upper flat vertical surface 48 which inclines outwardly at 50 and then extends vertically downwardly as at 52 to form the front face of the impeller chamber I. Immediately above the lower rounded bottom surface 54 of the hopper, and centrally thereof, the upper vertical wall 52 is provided with an inlet opening 56 of slightly larger diameter than that of the largest flight of the feed screw, this opening being covered by an outwardly extending flange hood 58 which is substantially semi-circular in end section. The hood 58 is open at its outer end as shown.

The side or bottom edges of the hood 58 extend downwardly around and over the inner part of the flights F approximately to the center line of the shaft S. The hood may be adjusted vertically by means of a slotted integral plate 59 having a handle 59', the plate being retained by a wing nut 61 threaded into the wall 52. Obviously, movement of the hood 58 from and toward the feed screw will respectively increase or reduce the rate of flow of material to the impeller chamber.

The hopper H also includes a lower vertical plate 60 which defines the lower front face of the impeller chamber I, as well as the front faces of the plurality of outlet passages for the plastic leading to the extrusion dies.

The inner face of the impeller chamber is formed by a vertical plate 62 which is substantially circular in its upper portion, which plate widens laterally at its lower portion 63 where it is bent inwardly as at 64 and thence downwardly as at 66 to form a rear wall enclosing support for the discharge passages and conduits leading to the extrusion die assembly D. As shown in Figure 4, the plate 62 is rigidly attached to the frame and provided with a substantially centrally located opening 68 for the shaft S. The hopper plate 52 may be locked to the inner face of the plate 62 by suitable accessible and detachable locking means as indicated at 64 in Figure 4.

As will be apparent from Figures 2 and 3, the entire front face of the apparatus comprising the hopper H and depending front vertical plate may be hinged for swinging movement to open up the impeller and distribution chambers, appropriate hinges suitably connected with the frame being shown at 65, there being cooperating locking means 66 spaced around the engaging edges of the fixed and hinged plates.

The plate 62 has integral therewith an edge flange or wall 70 of substantially circular form which extends around and closes the upper part of the impeller chamber, there being a continuation of this wall (not shown) but which extends laterally outwardly and downwardly to form the sides of the passages leading from the impeller chamber to the extrusion dies as hereinafter described.

As indicated in Figures 2 and 4, there are a plurality of suitably curved impeller blades 72 keyed to the shaft S within the chamber I, said plates presenting radially convex surfaces toward the direction of their clockwise movement as viewed in Figure 2. It will be noted that the width of the impeller chamber and the width of the impeller blades (Figure 4) is substantially less than the radius of the impeller chamber, or the radial lengths of the impeller blades. By reason of this construction, and because the plastic material is fed centrally into the impeller chamber and toward the impeller blades, the material will be rapidly and positively forced radially outwardly and released at the lower side of the impeller chamber into the distributing channels and conduits later to be described. There is thus no axial movement of the material from the impeller chamber, the limited axial movement being confined to that of delivery of the material into the impeller chamber.

The feed screw F comprises helical flights which gradually increase in diameter from an outer central point 74 to an inner terminal flight 76 which is of diameter almost as great as the inlet opening 56. The final flight 76 of the feed screw terminates short of the plane of rotation of the outer edges of the impeller 72 and within the passage defined by the side cover or hood 58. The screw is generally conical in form, the side of the cone being of substantially the same shape as the lower inner wall of the front 54 of the hopper. It will thus be apparent that material in the hopper H will flow or be drawn into the spaces between the flights of the feed nut both axially from its pointed end 74, downwardly from above the screw, and inwardly from the sides of the screw (Figure 3). This manner of feeding the material, with the base of the cone of the screw presented to the impeller, gives a progressive feed from the hopper with no tendency for the material to be thrown from the screw by centrifugal force. Due to the shape of the feed screw, and the shape of the hopper, the former is at the very bottom of the hopper and its flights are in substantial contact with the bottom of the hopper as shown in Figure 4. There is thus no possibility that material will accumulate in the hopper without being fed to the impeller, there being no space beneath the feed screw where this could take place.

As shown in Figure 2, the distribution and extrusion assembly depends below the impeller chamber, and this assembly may be wider than the diameter of the impeller chamber as is apparent in this figure. The front and rear walls 60 and 63 of the distribution and extrusion chamber define a plurality of distribution passages leading from the lower periphery of the impeller chamber, there being passages extending throughout almost the lower 180° of said chamber. There are approximately eight of such passages between point 80 and points 82. Each of these passages, designated as 84 in Figures 2 and 5, is separated from adjacent passages by vertical metal walls 86 carried by the front wall 60. There are also lower vertical partition plates 88 carried by a lower extension of the rear wall 63, which divide each passage into a plurality of conduits as shown in Figure 5. The lower wall of the impeller chamber is formed by a plurality of curved plates 90 carried by the front wall 60 which are spaced vertically from the peripheral edge of the impeller plates 72. Looking downwardly on these plates as in Figure 8, they are shown provided with diagonal openings 92 which extend from adjacent the inner wall 63 at the right-hand side of each passage as viewed from the front diagonally to adjacent the front wall 60 of the passage at the left-hand side. It will be understood that, as viewed in Figures 5 and 8, the impeller blades in their rotation move from the right toward the left, and the diagonal arrangement of the ports or openings 92 insure an even distribution of the plastic material throughout each of the passages 84.

Referring to Figure 6, the material passing through the slot 92 falls onto the inner surface of the inclined wall 64 and is pressed down the same by centrifugal force to enter the restricted throat portion 94 of the passage, although the material passing through the extreme left-hand ends of the slots 92 may fall directly into the throat 94. In order to regulate the quantity of material entering a particular passage 94, or to cut off the flow of material altogether into such passage, an adjustable closure plate 100 (Figures 6 and 7) is mounted for sliding movement beneath the plate 90, and this closure plate has an edge as shown by the dotted lines in Figure 8 of the same diagonal shape as the edges of the opening 92. The closure plate 100 is carried by a forwardly extending rod 102 which passes through an opening in the front wall 60, and its outer end is threaded into a nut 104 having a head 106 which retains the nut against axial movement. By turning the nut, the rod 102 is moved inwardly and outwardly to adjust the closure plate 100 throughout the slot or opening 92. The above constitutes distribution control for a relatively greater mass of the material fed by centrifugal force from the impeller chamber into the passage 84 and thence into the restricted throat 94 of said passage. The passage 84 and the throat 94 permit masses of the material to build up therein under action of the impeller, so that even flow from the extrusion orifices will result.

Referring to Figure 6, the rear wall of the restricted throat 94 is formed by an upper plate 110 of a removable die shoe 112, which curves inwardly at its lower end as at 114. This die shoe may be removably attached to the lower end of the rear plate by any suitable means such as bolts 116 having wing nuts 118.

The lower end of the front plate 90 carries an inwardly directed flange 120 which forms the bottom of the throat portion 94 of the passage 84, this flange leaving a relatively small passage 122 between its inner edge and the forward face of the rear plate 110 of the die shoe. In order to adjust flow through each of the conduits 122 thus formed or to completely close off any one of said conduits, there is a movable closure plate 124 in each conduit which is operated by a screw 126 in the same manner as previously described, to close off the port 122 or individually regulate the flow therethrough.

Referring to Figure 6, a laterally extending plate 130 is suitably secured in spaced relation to the wall 110 of the die shoe 112 by bolts 131 and this plate has spaced threaded openings 132 therein whereby the upper end of a suitably curved die plate 134 may be attached, the lower ends of said plate having a hook portion 137 which engages in a suitable recess 138 in the lower outer face of the die shoe. The die plate 134 has a plurality of extruding openings or orifices extending therethrough, same being designated as 140 in Figures 5 and 6.

The partition plates 88 which define the sides of the final narrow conduits leading to the extruding orifices are carried by and between the inner face of the die shoe and the plate 130 fixed thereto. A bar 135 extending across the face of the die assembly (Figures 2 and 5) holds the upper edge of the curved die plate 134 rigidly in place.

Extending longitudinally through the entire die head assembly is a shaft 144, the ends of said shaft extending beyond the side walls thereof as shown in Figure 5 and also as indicated in Fig. 2. There is a cutter arm 146 having a curved cutting blade in each of the extruding chambers secured to the shaft 144, so that as said shaft is oscillated the blade is moved downwardly to cut off a length of the material being extruded through the orifice 140. This may be done manually by an operating handle 152 as indicated in Figure 5, or appropriate automatic driving means to oscillate the shaft 144 may be provided, driven by the primary source of power through any suitable timing mechanism. It will be understood that a conveyor is generally used in association with this apparatus which will carry trays moving, for instance, from left to right beneath the extrusion orifices 140 as in Figure 6. It is possible to so time the operation of the cutting knives 148 so that lengths of the material are cut off to drop into each tray, the orifice being closed when the space between the adjacent trays is passing beneath the die. It will be particularly noted that the cutting blade 148 is within the die plate 134, so that the material extruded is not affected or distorted in its shape by the action of the knife.

Referring to Figures 13 through 17 various other forms of the extruding orifices are shown, and it will be understood that individual die plates 134 may be selectively applied to vary the form of the extruded material, or to vary the size and amount of a string material being extruded. Any or all of the extruding orifices may be used at the same time, or certain of them may be used intermittently, and strings of the plastic material may be discharged from the machine of uniform contour, or different shapes may be simultaneously discharged at the different orifices by varying the form of the orifices in a given plate, or by using several plates having different orifices to form the front of the assembly.

From the above, it will be obvious that I have provided very refined control of the product from the time it is initially acted upon by the feed screw F until it is discharged at the die orifices. As previously stated, the apparatus departs radically from prior art devices where, for instance, the pressure exerted by a helical screw is relied on to directly force the material through the dies, or where beaters are employed to press or mash material through a screen or the like. In the case of our machine the impeller rapidly builds up a high pressure by centrifugal force, and refined control means are provided to control the extrusion of this material. It is obvious that the control may be exercised while the machine is in operation and while observing the delivered product.

The can scraper R may be driven from a motor 160 suitably mounted on the frame by belts 162 and 164 through suitable change speed pulley arrangements 166 or any equivalent devices. The shaft for the scraper is indicated at 168 and it extends upwardly at an angle above the hopper H and the feed chute C, being supported in suitable antifriction bearings as indicated in Figure 4.

Referring to Figure 9, the upper end of the shaft 168 has adjustably but rigidly fixed thereto outer and inner sleeve brackets 170 and 172 respectively, these brackets having outwardly projecting spaced flanges 174 to which are pivoted oppositely disposed pairs of outer and inner connecting links 176 and 178, these links being recessed as at 180 to fit between the flanges 174 of the brackets 170 and 172, the upper outer corners or edges of said brackets being rounded off as at 182 so that the links 176 and 178 may pivot upwardly around the connecting pivot pins 175, while being prevented from pivoting downwardly beyond horizontal position because of the square lower edges of the flanges of said brackets which engage ledges 183 on said links. Each of the links 176 and 178 is pivoted as at 184 to spaced flanges 185 of brackets 186 which are connected with vertical hard wood scraper blades 187. In a manner similar to that previously described, the lower inner edges of the flanges of the brackets 186 are rounded so that the blades 187 may move inwardly as the links 176 and 178 pivot upwardly, the upper inner edges of said flanges being square to prevent their movement beyond the horizontal position as viewed in Figure 9. The scraper blades 187 may be of any desired form having an outwardly extending tapered scraping edge 188 as shown in Figure 10. At the upper ends of the scraper blades 187 oppositely extending top hard wood scraper bars 190 and 192 are provided. These bars do not connect with one another, but are in side by side relation, one bar being connected to the top of one of the side scrapers and the other bar being rigidly connected to the top of the other side scraper as by bolts 193.

The scraper is normally held in the condition shown in Figure 9 by the low tension of springs 196 which extends between hooks 199 fixed to the shaft 168 and hooks 200 which are attached to the lower brackets 186 on the respective side scraper bars 187. When a container of material is to be cleaned, it is placed over the top of the device as shown in Figure 9 with the open end of the can extending downwardly, the engagement of the bottom of the can with the top of the cross bars 190 and 192 and the application of pressure by hand causing the side scraper bars 187 to move downwardly with respect to the shaft 168, the top scraper bars 190 and 192 yielding horizontally with respect to one another to permit the downward movement of the side scrapers 187. The downward movement is permitted by the pivoting action of the links 176 and 178, which may be moved to a horizontal position if the diameter of the can requires it, although it will be apparent that the diameter of the container may be a limiting factor on the degree with which the device may be expanded to a condition short of maximum. If desired, a bolt with a head slightly wider than the shaft 168 (not shown), may be threaded into the upper end of said shaft, and may be adjusted inwardly and outwardly by a lock nut to provide a stop limiting the downward movement of the top scraper bars.

Bolts and nuts 193 are shown for securing the top scraper bars 190 and 192 to the upper ends of the blades. If refined adjustments of the scraper are required, the top bars may be so secured by single wing nuts in order that the bars may be adjusted at right angles to the shaft 168 after the adjustment of brackets 170, 172 has been completed.

When a container is thus applied to the scraper, suitable electric controls are actuated to turn the shaft 168 at the desired speed, and the side blades 187 will scrape the side of the can and the top blades 190 and 192 will scrape the inner end of the container, discharging the material into the chute C and the hopper H.

The scraping device automatically accommodates itself to cans of various sizes of any given shape. The device may be adjusted for use with containers of shapes other than cylindrical, for instance, containers of flared shape, by appropriate adjustment of the respective center brackets 170 and 172 along the shaft 168, same being secured by set screws 171'. This adjustment may be made by moving one or both of the brackets 170 and 172, but a simple adjustment can be made by merely moving the upper bracket 170, for example, downwardly a short distance on the shaft 168 and then rigidly securing the same in order to adapt the device for action on a flared container.

It will be apparent that we have provided apparatus and methods which will insure a high degree of control in the extrusion of plastics of the type mentioned herein. It will also be apparent that the machine is of simple and convenient design, and capable of being quickly and easily taken apart for replacement of parts, or for purposes of cleaning.

We claim:

1. Apparatus for processing plastic materials comprising an impeller chamber, a feed hopper for the material adjacent one end of said chamber, a drive shaft extending centrally into said chamber, impeller blades on said shaft, means for rotating said shaft and said blades at high speed in said chamber, said chamber having an inlet leading from said hopper into the center of said chamber, and means in said inlet synchronously driven with said impeller blades for continuously feeding the material into said chamber and between said blades adjacent their center of rotation, said chamber being enclosed by a side wall except for a discharge passage leading from its periphery at one side thereof.

2. Apparatus as set forth in claim 1 wherein said means synchronously driven with said impeller blade comprises a screw conveyor driven by an extension of said drive shaft into said feed hopper.

3. Apparatus as set forth in claim 2 wherein said screw conveyor is formed of substantially helical flights which reduce in radius to substantially a point at one end of the conveyor, the larger end of said conveyor extending substantially into the inlet opening of said chamber.

4. Apparatus as set forth in claim 1 wherein said feed hopper has an inner bottom side inclined downwardly toward said inlet in said impeller chamber and wherein said synchronously driven means comprises a conveyor formed of substantially helical flights substantially cone shaped in outside contour, said conveyor being positioned so that its point projects from said opening with said flights in substantial contact with said inclined inner bottom side of the feed hopper.

5. Apparatus for processing plastic materials comprising an impeller chamber, a feed hopper for the material adjacent one end of said chamber, a drive shaft extending centrally into said chamber, impeller blades on said shaft, means for rotating said shaft and said blades at high speed in said chamber, said chamber having an inlet leading from said hopper into the center of said chamber, means in said inlet synchronously driven with said impeller blades for continuously feeding the material into said chamber and between said blades adjacent their center of rotation, said chamber being enclosed by a side wall except for a discharge passage leading from its periphery at one side thereof, and an outlet at the outer termination of said passage, whereby the material is continuously fed into the center of said impeller and discharged from said side of said chamber by the centrifugal force asserted by high speed rotation of said impeller blades and extruded from said outlet by pressure of the material built up in said discharge passage by said impeller.

6. Apparatus as set forth in claim 5 wherein means are provided to change the speed of rotation of said impeller for varying the delivery of extruded material through said outlet.

7. Apparatus as set forth in claim 5 wherein said passage and said impeller chamber are separated by a plate having an elongated opening therethrough arranged diagonally with respect to the direction of movement of the periphery of the impeller blades past said plate.

8. Apparatus for processing plastic materials comprising an impeller chamber, a feed hopper for the material adjacent one end of said chamber, a drive shaft extending centrally into said chamber, impeller blades on said shaft, means for rotating said shaft and said blades at high speed in said chamber, the width of said chamber defined by opposite end walls being substantially less than its radius, said chamber having an inlet through one end wall leading from said hopper into the center of said chamber, the opposite end wall of said chamber being closed to prevent longitudinal movement of material through the chamber, and means in said inlet synchronously driven with said impeller blades for continuously feeding the material into said chamber and between said blades adjacent their center of rotation, said impeller chamber being enclosed by a side wall except for a discharge passage leading from its periphery at one side thereof.

9. Apparatus as set forth in claim 8 wherein a plurality of separate discharge passages are provided leading from the periphery at one side of said impeller chamber, each of said separate passages having an opening at its outer end and an adjustable closure regulator to govern the volume of material forced therethrough by said impeller.

10. Apparatus for processing plastic materials comprising an impeller chamber, a feed hopper for the material adjacent said chamber, a drive shaft extending centrally into said chamber, impeller blades on said shaft, means for rotating said shaft and said blades at high speed in said chamber, said chamber having opposite end walls, one of said end walls having an inlet leading from said hopper into the center of said chamber, said blades being of a width substantially equal to the distance between said end walls and being substantially uninterrupted in contour from said shaft to their periphery, and means in said inlet synchronously driven with said impeller blades for continuously feeding the material to said chamber and between said blades adjacent their center of rotation, said chamber being enclosed by a side wall except for a discharge passage leading from its periphery at one side thereof.

11. Apparatus for processing plastic materials comprising an impeller chamber, a feed hopper for the material adjacent said chamber, a drive shaft extending centrally into said chamber, impeller blades on said shaft and within said chamber, means for rotating said shaft and said blades at high speed, said chamber having an inlet leading from said hopper into the center of said chamber, and means in said inlet and driven by said shaft for continuously feeding material into said chamber.

HUBERT HARRIS.
LAMAR MIMS WARE.

REFERENCES CITED

The following references are of record in the file of this patent:

UNITED STATES PATENTS

| Number | Name | Date |
|---|---|---|
| 498,206 | Denbeigh | May 23, 1893 |
| 518,942 | Duhrkop | May 1, 1894 |
| 672,554 | Henkel | Apr. 23, 1901 |
| 1,010,175 | Pooley | Nov. 28, 1911 |
| 1,158,908 | Ehrhart | Nov. 2, 1915 |
| 1,709,405 | Patitz | Apr. 16, 1929 |
| 1,773,552 | Sizer | Aug. 19, 1930 |
| 1,777,294 | Dellenbarger | Oct. 7, 1930 |
| 1,887,138 | Peffer | Nov. 8, 1932 |
| 2,245,308 | Thalman | June 10, 1941 |
| 2,308,937 | Schwab | Jan. 19, 1943 |